UNITED STATES PATENT OFFICE.

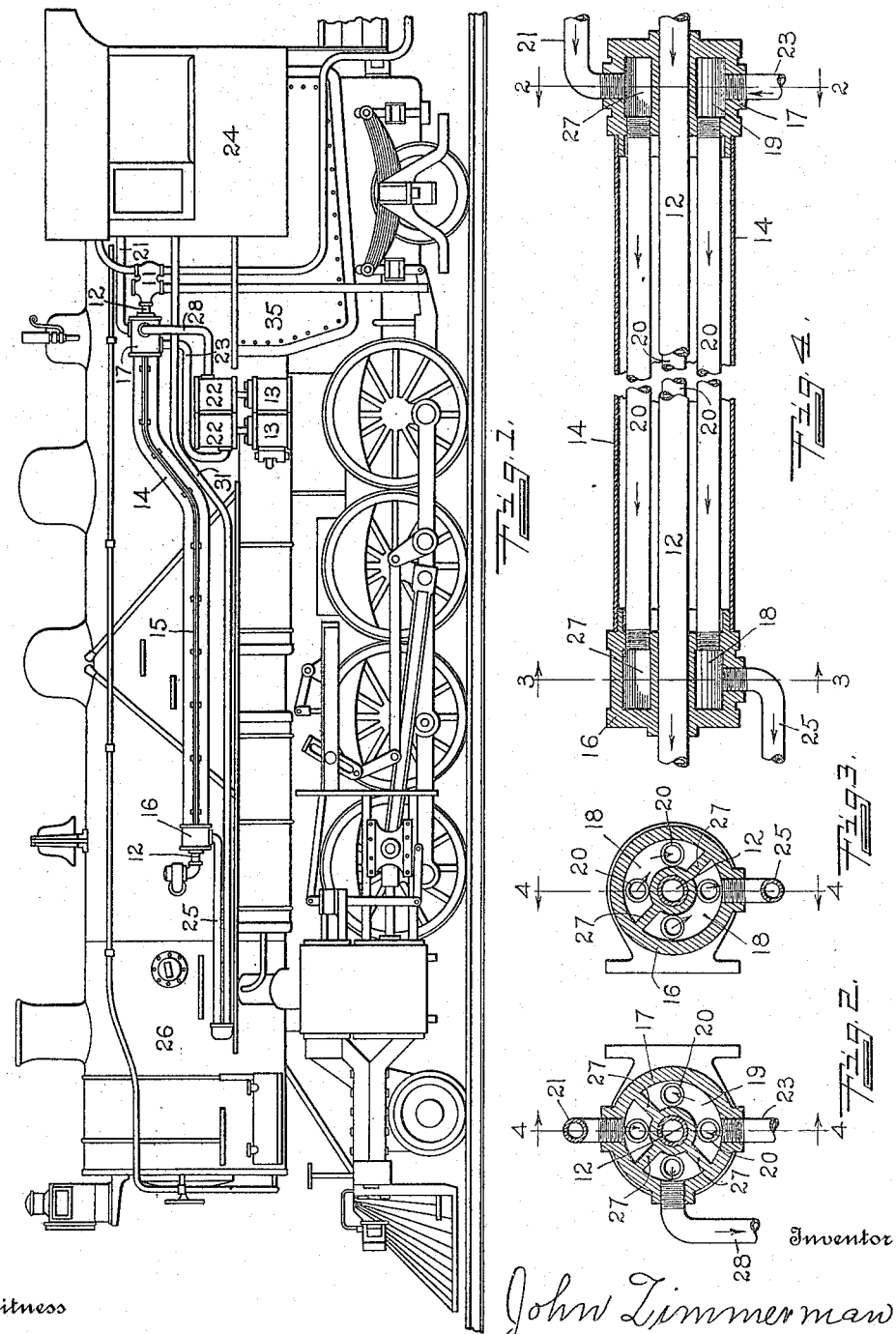

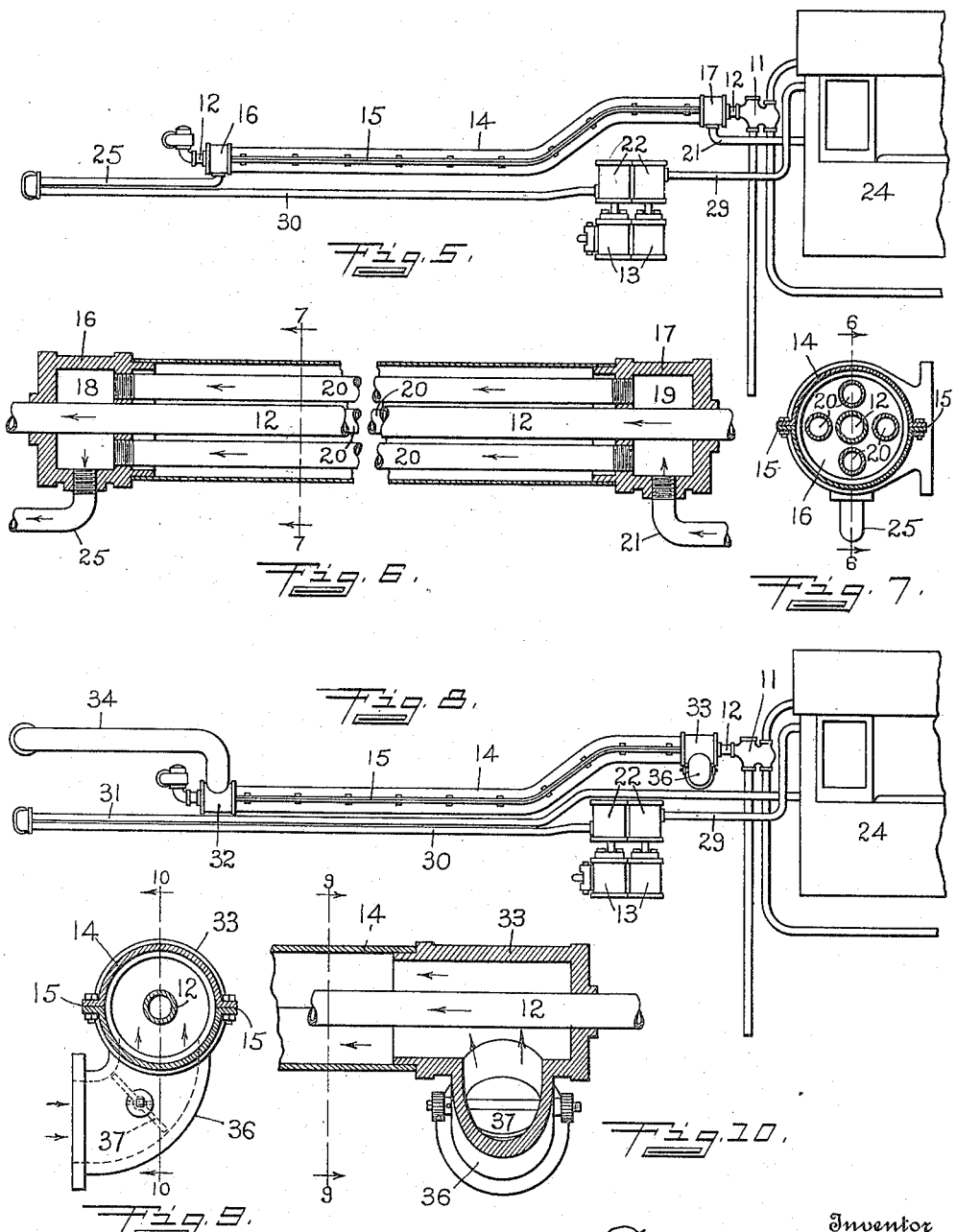

JOHN ZIMMERMAN, OF COUNCIL BLUFFS, IOWA, ASSIGNOR OF ONE-HALF TO BENJAMIN F. MADISON, OF COUNCIL BLUFFS, IOWA.

HEATING APPARATUS FOR INJECTOR-PIPES OF LOCOMOTIVES.

1,194,325.

Specification of Letters Patent.

Patented Aug. 8, 1916.

Application filed January 21, 1916. Serial No. 73,452.

*To all whom it may concern:*

Be it known that I, JOHN ZIMMERMAN, a citizen of the United States, residing in Council Bluffs, in Pottawattamie county, in the State of Iowa, have invented certain new and useful Improvements in Heating Apparatus for Injector-Pipes of Locomotives, and have described the same in the following specification, illustrated by the accompanying drawings.

My invention relates to that class of apparatus which is used for the purpose of heating the contents of ejector pipes, otherwise called injector delivery pipes, conducting feed water to the boilers of locomotive steam engines.

It is the object of the invention to effect this purpose in a new and advantageous manner, economical of heat and fuel; to husband the heat produced from the fuel; to improve the distribution of the heat-carrying media; to prevent the freezing of the injector pipe in cold weather; and in general to produce a superior apparatus of the specified class to accomplish this object I incorporate in my improved apparatus, as parts thereof, a casing through which the injector pipe is led and special means for introducing heat-carrying media into the casing, and for distributing the same around the injector pipe therein.

In the accompanying drawings, illustrating the best manner in which I have contemplated applying the principles of the invention, Figure 1 is a side elevation of a locomotive steam engine which is equipped with my improved heating apparatus. Fig. 2 is a vertical transverse section on the section line 2—2 in Fig. 4, through the casing of the same apparatus, as shown on one side of the engine in Fig. 1. Fig. 3 is a like section on the section line 3—3 in Fig. 4. Fig. 4 is an axial vertical longitudinal section on the section line 4—4 in Figs. 2 and 3. Fig. 5 is a side elevation of a portion of Fig. 1, including the injector, the injector pipe, the injector pipe casing and the air-pump, together with a modified system of steam connections. Fig. 6 is a central vertical longitudinal section of a portion of Fig. 5 on the section line 6—6 in Fig. 7. Fig. 7 is a vertical transverse section on the section line 7—7 in Fig. 6. Fig. 8 is a modification of Fig. 5, which is adapted to use gases from the firebox as the heating medium. Fig. 9 is a transverse vertical section of a portion of Fig. 8, on the section line 9—9 in Fig. 10. Fig. 10 is vertical longitudinal section on the section line 10—10 in Fig. 9.

These views show the injector 11, the injector pipe 12, the air-pump 13 and the air-pump steam cylinders 22, all of an ordinary construction, and mounted in the usual manner on one side of a locomotive steam engine of an ordinary type. The casing referred to comprises the split tube 14, which is united by the flange joints 15. This casing is approximately as long as the injector pipe, as well as larger in diameter, and is bent to follow the course of this pipe co-axially from end to end. It comprises also the terminal heads 16 and 17, which cap the tube 14 and are perforated in the middle and hermetically fitted to the injector pipe extending therethrough. These heads are hollow and have the internal chambers 18 and 19 respectively. The space between the heads of the casing, constitutes a hot air chamber, occupied partly by the injector pipe and partly by the steam pipes about to be described. In the preferred form of the invention, shown in Figs. 1, 2, 3 and 4, these chambers are internally subdivided by the partitions 27 and are interconnected from head to head by the spaced steam pipes 20 constituting sections of a steam radiator in the casing; while the head 17 is connected with the air-pump steam cylinders 22 by the supply and exhaust pipes 28 and 23. In this form of invention, steam for heating the injector pipe and its contents, is conducted into the casing, partly as live steam brought from the fountain in the cab 24 by the pipe 21 to one of the compartments of the chamber 19, and partly as exhaust steam returned from the cylinders 22 by the pipe 23 to another of these compartments. After circulating through the pipes 20 in the course indicated by arrows in Figs. 2, 3, and 4, this steam supply is conducted from the chamber 18 into the smoke arch 26 by the pipe 25. By this method of distribution the injector pipe is subjected to the action of heat carried into the casing by live steam from the boiler and also by exhaust steam from the air-pump.

In the modification shown in Figs. 5, 6 and 7, steam is supplied to the pump cylinders 22 directly from the fountain by the pipe 29, and is conducted from the cylinders as exhaust directly into the smoke arch by the pipe 30; while steam from the fountain is conducted directly to the casing by the pipe 21, and, after passing through the pipes 20, is discharged from the casing into the smoke arch by the pipe 25.

In the modification shown in Figs. 8, 9 and 10, the connections of the cylinders 22 by the pipes 29 and 30, are the same as last described. In this modification, as well as in the preferred form of the invention, first above described, live steam is independently conducted from the fountain to the smoke arch by the blower pipe 31. In this modification the casing containing the coaxial injector delivery pipe 12, is a hollow cylinder, comprising the described tube 14 and the hollow terminal heads 32 and 33 united thereby. The head 32 is connected with the smoke arch 26 by the pipe 34; while the head 33 is connected with the top of the firebox 35 by the pipe 36 containing the damper 37. With this form of the apparatus, the injector pipe 12 is heated as required, by contact with the hot gases from the firebox, which fill that part of the casing not occupied by this pipe, and flow through the casing from end to end, as regulated by the adjustment of the damper.

I claim as my invention—

1. Apparatus of the specified class for heating an injector pipe, comprising a steam radiator, and a casing inclosing both the radiator and a portion of the injector pipe.

2. Apparatus of the specified class for heating an injector pipe, comprising piping for a heated medium, and a closed casing containing both a portion of the piping and a portion of the injector pipe.

3. Apparatus of the specified class for heating an injector pipe, comprising a steam radiator, and a tubular casing inclosing both the radiator and a portion of the injector pipe.

4. Apparatus of the specified class, comprising an injector pipe, a steam radiator, a casing inclosing both the radiator and a portion of the pipe, and means for conducting steam to and from the radiator.

Dated at Omaha, Nebraska, January 19th, 1916.

JOHN ZIMMERMAN.

Copies of this patent may be obtained for five cents each, by addressing the "Commissioner of Patents, Washington, D. C."